4 Sheets—Sheet 1.
R. GEORGE.
MACHINE FOR SEPARATING MINERAL AND FOSSIL SUBSTANCES.
No. 106,047.          Patented Aug. 2, 1870.
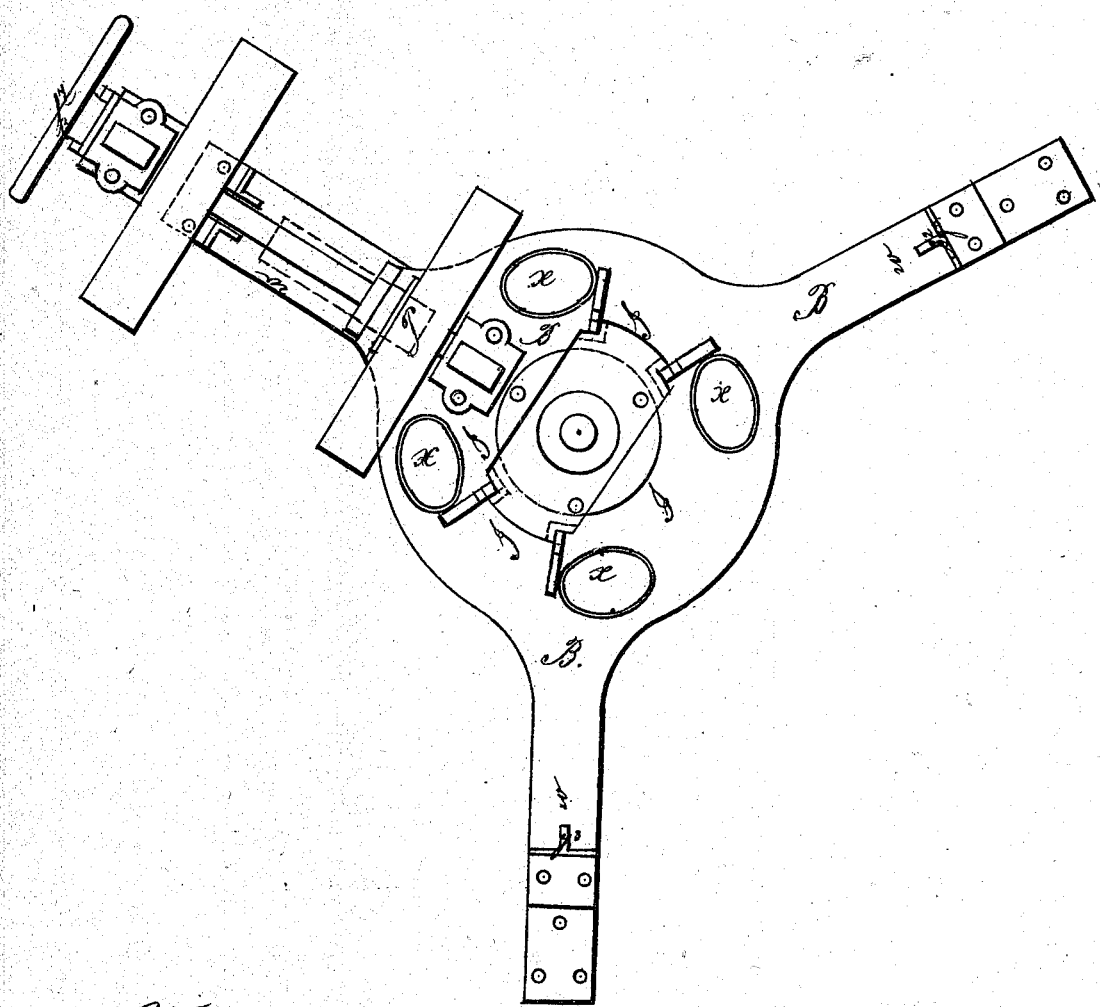
Witnesses
Wm M Martin
H C Johnson
Inventor
Robert George

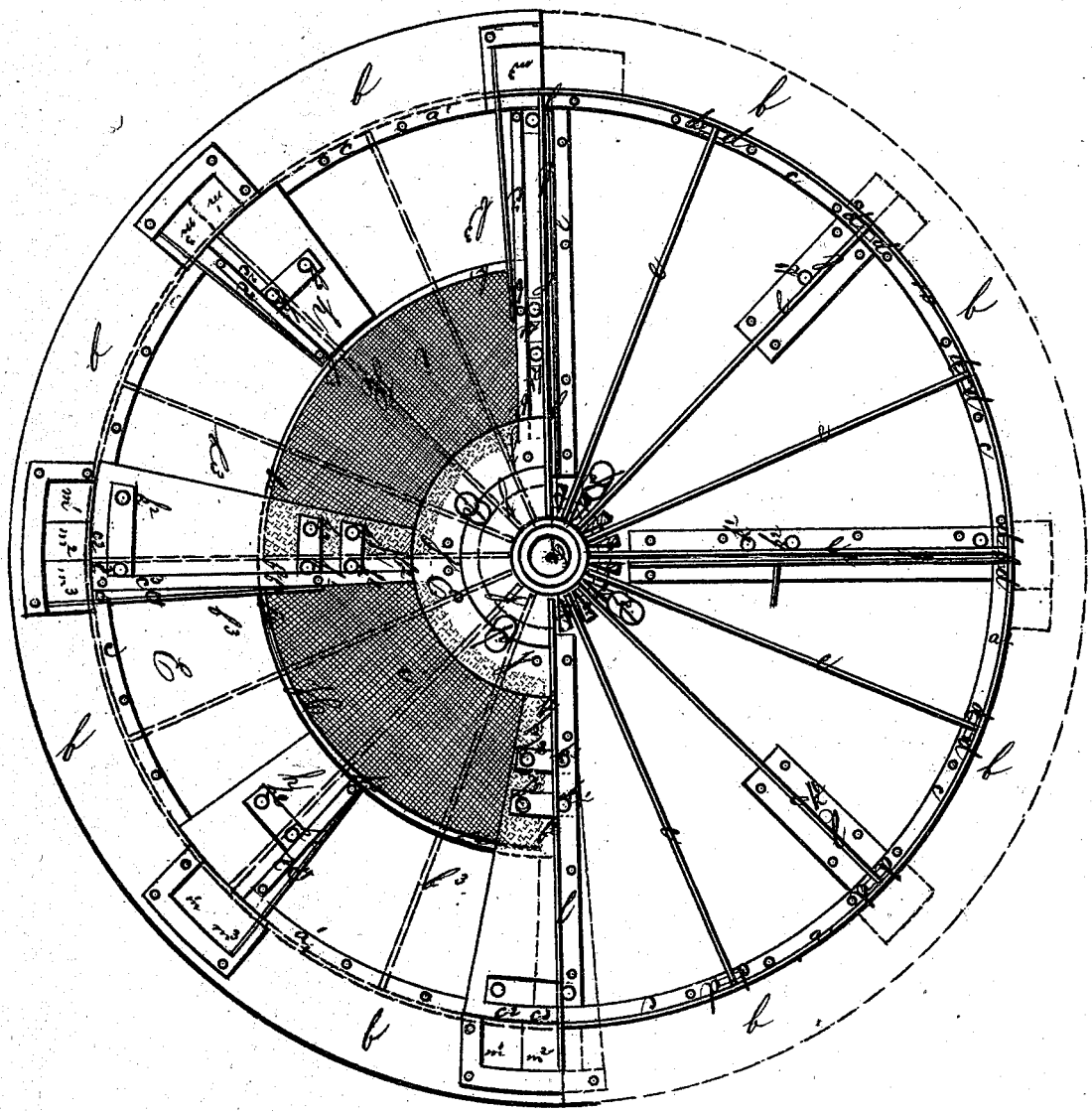

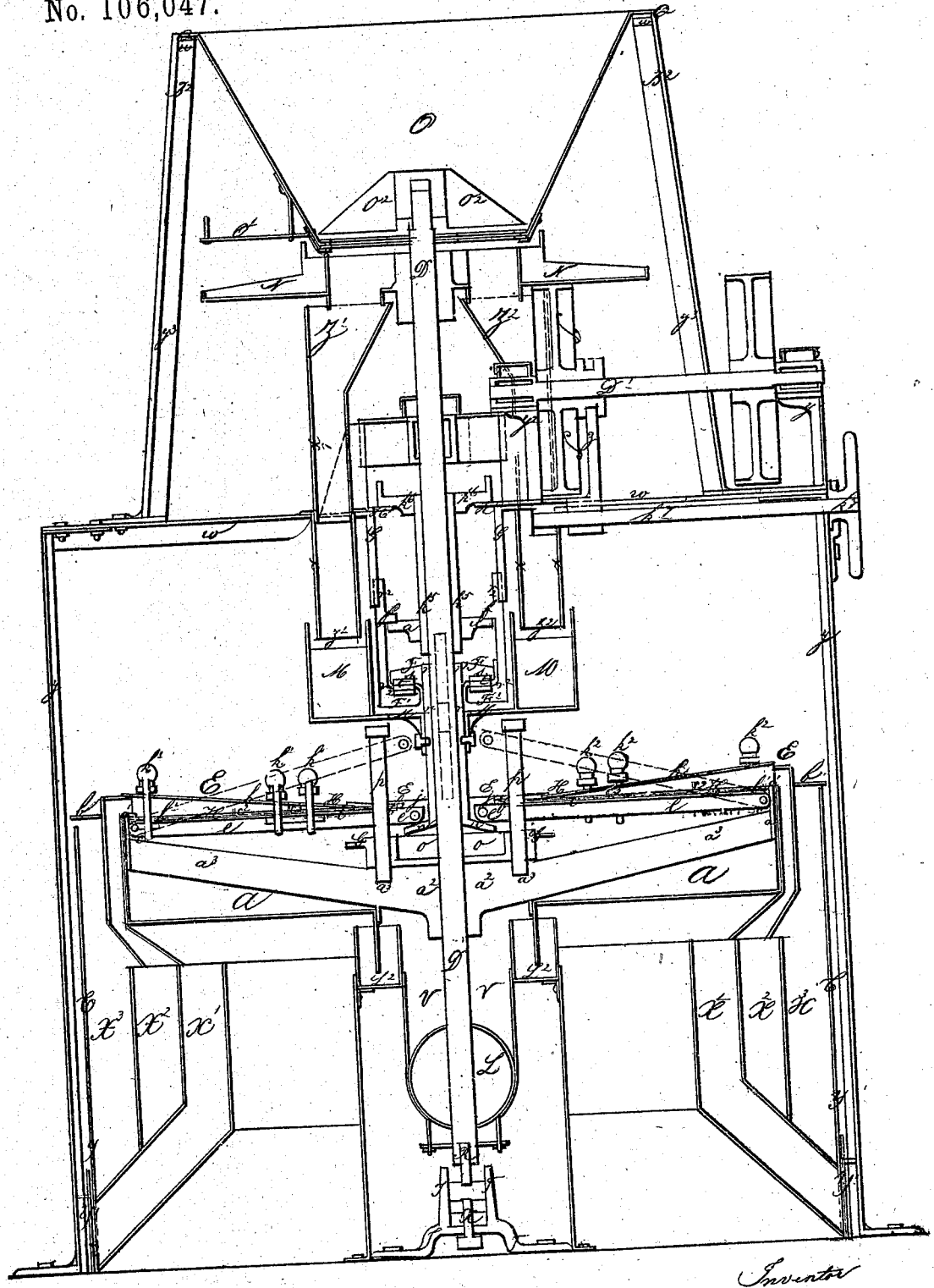

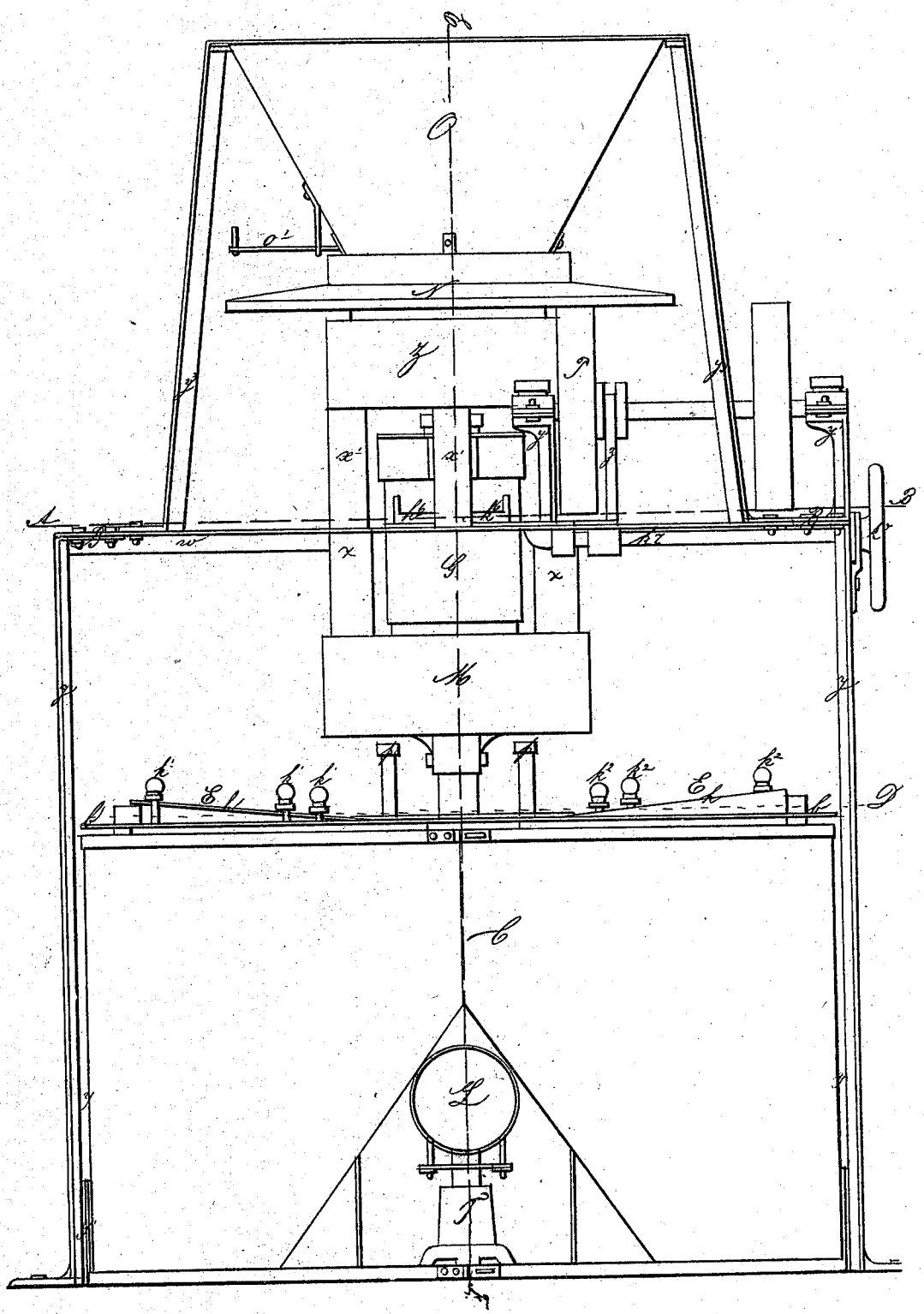

United States Patent Office.

ROBERT GEORGE, OF DENVER CITY, COLORADO TERRITORY.

Letters Patent No. 106,047, dated August 2, 1870.

IMPROVEMENT IN MACHINE FOR SEPARATING MINERAL AND FOSSIL SUBSTANCES.

The Schedule referred to in these Letters Patent and making part of the same.

*To all whom it may concern:*

Be it known that I, ROBERT GEORGE, of Denver City, in the county of Arapahoe, in the Territory of Colorado, have invented a new and useful Machine for Separating Comminuted Mineral or Fossil Substances, the separation of which, by the machinery heretofore in use, has been, on account of the minuteness of the particles, very imperfect; and I do hereby declare that the following is a full, clear, and exact description of its construction and operation, reference being had to the annexed drawings making a part of this specification.

Figure I, sheet 1, is a plan on the line A B.

Figure II, sheet 2, is a plan on the line C D, the one-half showing it covered with the disk, the other half with disk removed.

Figure III, sheet 3, is a vertical section on the line E F.

Figure IV, sheet 4, is a side elevation.

Similar letters, in blue ink, refer to similar parts in the several sections and elevations.

My machine is a centrifugal separator, and is constructed and designed for the separation of finely-comminuted minerals or fossil substances from dross or other extraneous substances.

The separation of materials of different specific gravity, charged in a sieve through which is forced a current of air or water, will take place if the current of air or water can be forced equally through its meshes, so as to form separate jets, which, passing upward in this manner through the materials, raise and carry the lighter particles off, while the heavier ones settle on the surface of the sieve; the operation will, however, be successful only in so far as these jets of air or water can be kept separate and distinct after having passed through the sieve. Heretofore this has been imperfectly done, and, as a consequence, there was always a great loss of the valuable materials, when the same, being operated, consisted of finely-comminuted or dust-like particles, for the reason that they cohered so closely together, and their minuteness being such, there was no space or interval through which the air or water could pass, and thus, through their cohesive power, presented such a degree of resistance as caused the consolidation of a sufficient number of jets of air or water, whose combined power of pressure was sufficient to overcome the same, and allow the air or water to make its escape, which it done either by raising the cohering mass and pushing it aside, or breaking through the same with a puff, whereby the particles were scattered but not separated.

To overcome this cohesive power I employ centrifugal power, in connection with a vibratory motion, by which the mass being separated is continually agitated by a hopper possessing a rotary and oscillating motion, for the purpose of spreading more regularly and evenly the materials discharged through the same, and which said materials, in their descent, come into collision with a current of air or water separated into distinct jets, to correspond with the meshes of the sieve through which they have passed, the lighter particles being thereby blown or carried off, while the heavier ones fall on the sieve. In this way a partial separation is effectuated; the heavier particles, on striking the sieve, are immediately exposed to the vibratory motion, as well as the continued pressure of the air or water, and by the combined action of which the lighter particles are immediately brought within the influence of the centrifugal power, and by which they are propelled tangentially toward the periphery of the disk, with a velocity in a ratio equal to their weight, which velocity increases progressively as the particles near the periphery, for the reason that the centrifugal power is constantly growing stronger and the cohesion less.

To enable others skilled in the art to make and use my invention, I will proceed to describe its construction and operation.

The machine consists of three main parts:

First, the tripod B;

Second, the chamber C; and

Third, the centrifugal separator A.

The centrifugal separator consists of the rotary sieve and assorter, which is constructed and composed of the following parts, viz:

The large iron wheel $a$, which is dished, and as the same revolves horizontally, its periphery $a^1$ is thus raised, so as to form a convex with its nave $a^2$, which two said parts are connected by the spokes or radii $a^3$. The periphery $a^1$ is right-angled, its base being secured to the ends of the spokes $a^3$, so that the perpendicular of the angle projects outward in a horizontal manner, and forms the water-rim $b$, which acts as a fly.

The periphery $a^1$ is furnished on its inside, a little below the vertex, with the circular flange $c$, extending around on the inside of the same, so as to rest immediately on the spokes $a^3$. This flange being at right angles with the periphery $a^1$, is furnished with the sockets $d$, into which are slipped the supports $e$, and to which they are jointed by bolts. These supports $e$ consist of two right-angled bars, whose bases are united in a T-shape, so as to leave an interstice in which the blade $g$ folds, and one end of which is pivoted to the same.

On the supports $e$ rests the disk E, which is composed of the four quadrantal plates H. Said plates consist of two parts, viz., the inner rim $b^1$, which is a quadrantal iron plate with two arms, $b^2$. In this rim are the interstices $l$, through which the blade $g$ passes. This inner rim $b^1$ is fastened to the outer rim $b^2$ by being sunk into it a little, and then bolted. On the same, and the upper end of $b^2$, rests the quadrantal-shaped sieve $i$, and is fastened thereto by compression, by means of bands and bolts.

The disk E is furnished, on its upper side, with the wings $h$, of different lengths, extending alternately from the plate $j$ over the inner edge of rim $b$, and from the edge of sieve $i$ to the inner edge of rim $b$. These wings are fastened to disk E, with which they form an acute angle, by screws $k^1$ $k^2$ $k^3$, and pivots. Screws $k^1$ $k^2$ are regulating-screws, by means of which the acuteness of angle formed as aforesaid is governed, and also the interstice $l^1$, underneath these wings, and securely fastened to disk E are two vertical flanges, $c^2$ $c^3$, running parallel with the wing, the shortest and lowest flange being $c^2$, the longest and highest $c^3$, which is next immediately in front of the blade $g$, and prevents any dust or materials getting into interstice $l$.

Running parallel with the wings $h$ is the pendent trough $c^4$, resting on the disk E in such a manner that it projects out from under the elevated edge of the wings $h$. This trough $c^4$ and the flanges $c^2$ $c^3$ open into the conduits $m^1$ $m^2$ $m^3$, being pipes, and cast with the wheel $a$, as a part of its periphery. The other ends of the supports $e$ are upheld by the conical flange $n$, which is provided with the niches $n^1$, into which the supports are slipped, and in which they slide.

The cone $n$ is the base of the wheel F, and rests upon India-rubber or metallic cushions or springs, $o$, which cushions are kept in position by being sunk in the disk G, which is furnished with a recess for that purpose. The disk G rests on and is supported by the screws $p$, by which it is also raised or lowered. The screws $p$ rest in pits sunk n the spokes $a^3$, and extend up through the plate $j$. This plate $j$, through which passes the tubed nave of the wheel F, which encompasses the shaft D, overlaps the apex of the quadrantal plates H, and, being securely fastened to the conical flange $n$, fastens the same, by compression, firmly to the supports $e$.

The bottom part of the centrifugal separator A is covered with sheet-iron, which forms, at the nave, the pipe $v$, extending downward, so as to be at right angles with the bottom. In this manner a hollow wheel, composed of the foregoing parts, is constructed, whose axis is the shaft D, and to which it is secured by keying its nave $a^2$ to the same.

The wheel F consists of the tubed nave $r$, which terminates in the conical flange $n$. To the upper part of this tube $r$ is screwed, left-handed, the disk $s$, the under side of which is provided with a circular groove or recess, into which fits the circular toothed plate $t$. The teeth of plate $t$ are of an angular shape, and converge toward the nave in a radial manner, and are at right angles with their plane, being disk $s$, and into which plate $t$ is fastened, by countersunk screws or bolts. The axis of wheel F is the shaft D, to which it is fastened by a spline. The wheel F' is the counterpart of wheel F, excepting it has no conical flange. The tubed nave $r^2$ of wheel F' fits and works in tube G telescopically, and to which it is keyed, admitting, however, of its telescopic movement. The inside of the tubed nave $r^2$ is furnished with the two projections $f$, the under part of which have a recess into which sinks the shoulders $u$ of the tubed male screw $k^5$, which said screw passes up through plate H', and into which is fitted and fastened the female screw $k^6$, and terminates in a flat head, furnished with handles at right angles with the periphery, by which it is turned. By turning screw $k^5$ the shoulders $u$, sinking in the recess of the projection $f$, forces them upward, and thereby tubed wheel F' is raised, and as tubed wheel F is in gear with tubed wheel F', it follows that that also will be raised, by the raising of which, with its conical flange or base $n$, on which rest the supports $e$, disk E is raised from a plane to an incline; furthermore, by screw $p$ is regulated the pitch line of wheels F and F'.

Wheel F having a rotary motion, and wheel F' being stationary, it follows that, when wheel F rotates, on account of being in gear with wheel F', it will also have an oscillating motion, by which the disk E, which rests on it, as aforesaid, will be constantly oscillating.

Tube G is a part of disk I, fig. I, which said disk I rests upon and is securely fastened to the arms $w$ of the tripod B.

This disk is perforated by four circular holes, in which slide the pipes $x$, which are regulated by screw-nuts.

These pipes fit telescopically pipes $x^1$, which pipes $x^1$ are united in a circular manner, forming four convex mouths, which are surrounded by the rims $z^1$ $z^2$, and are supported by uprights sitting on disk I.

Immediately below disk I is the hopper $m$, consisting of two cylindrical plates, the one encompassing the other, and joined by spiral strips, which also form the interstices at the bottom of the hopper, through which the materials pass onto the sieve $i$.

This hopper is keyed or otherwise fastened to tube $r$ of wheel F, and has, therefore, as oscillating and rotary motion.

Immediately over the mouths Z is the horizontal friction-wheel $n$, whose short spokes or radii form intervals, between which the materials pass from the hopper O into mouth Z. The axis of friction-wheel N is shaft D, to which it is keyed. Wheel N is also furnished with two rims, the one below and the other on top, and, being at right angles with its plane, these prevent the materials passing through from being wasted or lost by passing over its side.

The wheel N, at its periphery, rests on the vertical friction-wheel P, revolving on its own axis, and which is supported by the extended upright $y$ and the support $y^2$.

Running parallel with the arm $w$, on which rests wheel P, and being underneath, is a long male screw, $k$, which governs and regulates the clutch $z$, and by means of which wheel P is forced from the periphery toward the nave of wheel N, or *vice versa*. In this manner is regulated the speed or velocity of the whole apparatus.

The hopper O is of a funnel-shape, its bottom being provided with a rotary damper, $O^1$, wherewith is regulated the discharge of materials into the apparatus.

The hopper rests in the circular plate Q, which plate rests on the arms of the small tripod $B^2$.

The shaft D extends up through hopper O, and it is squared at the top, to which is fitted the scraper $O^2$, which revolves with the shaft, and by means of which the materials in hopper O are being continually agitated and forced through the apertures in regular quantities.

The tripod B consists of three uprights, $y$, and three arms, $w$, to which is fastened the disk I, and upon which arms rest the tripod $B^1$, consisting of three uprights, $y^2$, and three arms, $w^1$, to which the plate Q is fastened.

As will have been seen, the shaft D extends the entire length of the machine, and, forming its axis, the upper end terminating in the hopper O, the lower end rests on the steel pin R, which is sunk and rests in a circular plate fitted into the cup of the step T, so that it can slide up and down, and is regulated by the screw U, and by means of which the shaft D is raised or lowered.

The receiving-chamber C consists of two semi-circular parts, each part being divided into three semi-circular chambers, $X^1$ $X^2$ $X^3$, which are so formed that the bottom part of the innermost chamber $X^1$ extends in an inclined manner underneath the chambers $X^2 X^3$, and $X^2$ underneath $X^3$.

In this manner the bottom of each chamber faces the outside wall Y, which is provided with slides $y^4$, or such similar contrivance, through which the chambers discharge their contents.

Into these chambers the conduits $M^1 M^2 M^3$ open.

By constructing the bottoms of the chambers $X^1 X^2 X^3$ in this manner, there is formed in chamber C a triangular opening, into which extends the pipe L, which is a long pipe furnished with an elbow, which elbow is surrounded by the circular rim $L^2$.

Over the elbow is slipped pipe V, resting in the rim $L^2$, which is filled with mercury, making an air-tight joint.

As the shaft D passes through the elbow of pipe L, I provide the bottom part of it with a packing-box, so as to prevent the escape of any air or water therethrough.

The manner of operating my machine is as follows:

To the axis of wheel P is connected the motive power by which the apparatus is worked. Pipe L is in connection with a blowing-machine, so that a current of air is forced up through it, into the separating-chamber A, and from which it makes its escape through the interstices $l$ and the sieves $i$. The materials to be separated are placed into hopper O, through which they are forced by the rotary scraper $O^2$, and fall through, between radii or spokes of wheel N, into the mouthed pipes $x$ and $x^1$, by which they are conducted into the oscillating and vibrating hopper M, by which they are evenly distributed over sieve $i$, when separation begins. When the particles of the mass to be separated have been agitated and exposed to the centrifugal power, as aforesaid, those particles of equal weight will move in a sliding or rolling manner from the center toward the periphery of the separator, and, as they move in a tangential direction, they come in contact with the wings $h$. As the particles of greatest specific gravity are least in bulk, they immediately pass through the interstice $l'$, which, being regulated by screw $k^2$, will admit of any size desired. Those particles being of an equal weight, but less specific gravity, will be of the greatest bulk, and, as a consequence, cannot pass through the interstice $l'$, and will be forced to rise and slide over the wing, as particles of a greater bulk are more easily carried off by the centrifugal power, whose power of action is dependent on the circumference which the particles expose to its action. The current of air or water which is continually issuing on each side of the blade $g$, up through the interstice $l$, prevents the choking of interstice $l'$, or of the flanged troughs $c^2 c^3$. Of those particles raised and forced over the wing, the heavier ones will drop down on arriving at the elevated edge of the same, whereas the latter ones, having an inclined direction, will pass away over those dropping down at the edge of the wing, are caught in the trough $c^4$, and the current of air exuding up through interstice $l$, and which has been divided by blade $g$, upon which rests the wing $h$, will prevent any but those particles of a greater specific gravity from falling into trough $c^4$, as the power of its pressure forces the others over the sieve. The shorter or alternate wings operate in the same manner, excepting they have but one trough, $c^2$, besides trough $c^4$, and are designed to gather and collect those particles falling on the center of the graduated plates, and which otherwise would be carried off tangentially by the centrifugal power before coming in contact with the longer wings, and, as these consist of larger particles, only trough $c^2$ is dispensed with.

What I claim as my invention, and desire to secure by Letters Patent, is—

1. The process of separating minerals and valuable fossil substances from extraneous substance by centrifugal apparatus, operating with a jet of air or water.

2. The centrifugal separator, constructed and operating as described.

3. The disk E, with sieves, plates, wings, blades, and flanges, in manner as constructed and described, together with its mode of operation and manner of fastening.

4. The tube-wheels F and $F^1$, their peculiar construction, together with their attachments and appendages.

5. The process by which the disk E is raised and lowered, so as to be either on a plane or an incline, together with the screw $k^5$, with its manner of construction and attaching.

6. For the manner of attaching the friction-wheels N and P, so as to regulate the velocity or speed of the apparatus.

7. The process of forcing air or water through materials, and thereby separating them, in the centrifugal separator A.

8. For the manner of constructing rim $L^2$, whereby joint of the pipe V and the pipe L are rendered airtight by the mercurial or water-packing.

In witness whereof I have, this 14th day of July, A. D. 1870, hereunto set my hand in presence of—

ROBERT GEORGE.

Witnesses:
E. P. WEBER,
LOUIS SCHULZE.